United States Patent [19]
Walsh

[11] Patent Number: 5,613,129
[45] Date of Patent: Mar. 18, 1997

[54] ADAPTIVE MECHANISM FOR EFFICIENT INTERRUPT PROCESSING

[75] Inventor: Robert J. Walsh, Ashland, Mass.

[73] Assignee: Digital Equipment Corporation, Maynard, Mass.

[21] Appl. No.: 236,930

[22] Filed: May 2, 1994

[51] Int. Cl.⁶ .................................................. G06F 13/24
[52] U.S. Cl. .................. 395/740; 395/735; 395/200.13
[58] Field of Search .................................. 395/725, 200, 395/750, 735, 740, 200.13; 364/707

[56] References Cited

U.S. PATENT DOCUMENTS

| | | | |
|---|---|---|---|
| 4,758,950 | 7/1988 | Cruess et al. | 395/725 |
| 4,994,960 | 2/1991 | Tuchler et al. | 395/725 |
| 5,038,281 | 8/1991 | Peters | 395/700 |
| 5,125,093 | 6/1992 | McFarland | 395/725 |
| 5,134,706 | 7/1992 | Cushing et al. | 395/725 |
| 5,249,269 | 9/1993 | Nakao et al. | 395/200 |
| 5,325,536 | 6/1994 | Chang et al. | 395/725 |
| 5,389,952 | 2/1995 | Kikinis | 345/212 |

*Primary Examiner*—Jack B. Harvey
*Assistant Examiner*—Jeffrey K. Seto
*Attorney, Agent, or Firm*—Christine M. Kuta

[57] ABSTRACT

Postponing the interrupt for an I/O event can increase system throughput by amortizing the cost of the interrupt service routine over multiple I/O events. In current systems that provide interrupt postponement, the time parameter is fixed. Fixed values can lead to parameter configuration errors, excessive characterization work to generate parameter values, and a failure to automatically re-configure to system changes or to external load changes. The proposed mechanism measures actual system experience and eliminates the parameter configuration effort by filtering its own experience to derive a target value for interrupt postponement. A current postponement value with the potentially greater variance than the target is used to rapidly respond to abrupt change in offered load. The invention also benefits tasks with real-time deadlines to provide correct system operation.

10 Claims, 6 Drawing Sheets

ADAPTIVE MECHANISM FOR EFFICIENT INTERRUPT PROCESSING

FIELD OF THE INVENTION

The present invention relates generally to systems having multiple I/O devices and, more particularly, to efficient interrupt processing on packet-switching platforms.

BACKGROUND OF THE INVENTION

In a system with multiple I/O devices, an interrupt mechanism is used by the I/O devices to access the central processing system. An I/O device generates an interrupt signal to indicate that there is a pending process. The generation of an interrupt signal is called an I/O event. The interrupt signal is also called an interrupt flag or an event flag. The interrupt signal is received and retained by the central processing system which completes the operation it is performing from the currently running program before interrupting that program to attend to the signalling I/O device. The interrupted program is returned to upon completion of some or all of the I/O device's processing. When there are many I/O devices on the system, many interrupts are generated. These interrupts may be generated at any time and they may be concurrent. Interrupts which are not handled immediately must wait to be serviced by the central processing system.

Interrupt processing can provide a low latency response to an I/O event, latency being the time between a request for action and a response to that request. However, when interrupt loads are high, low latency may lead to excessive overhead limiting system throughput. The overhead consists of saving and restoring the states of all the interrupted processes. Ideally, latency and throughput are balanced in order to have a smooth-running system.

Currently known methods of achieving a balanced system include cutting down on generated interrupts by providing additional buffering on an I/O device interface and generating an interrupt only after a specific number of I/O operations, for example, after a specific number-of character arrivals on a terminal interface board. Another method is providing additional buffering on an I/O device interface and having operating system software periodically poll for I/O completions.

In general, methods of balancing system latency and throughput involve delaying responses to the I/O devices' service requests. The total delay observed by any one I/O device interface is the sum of the delay introduced to increase throughput and the service time for the same-priority I/O devices which receive service before the delayed device. Where buffering and polling are used to balance the system, lower-priority devices may also contribute to delay if interrupt request lines are not constantly sampled and acted upon. In order to properly balance a system using currently known techniques, the system must be tuned in order to guarantee that the delay in servicing the I/O device is not a source of failures, for example, lost characters on a terminal line due to lack of buffering by the UART (universal asynchronous receiver/transmitter). Because I/O devices have different priorities and make different demands on the network, any change in the system configuration, that is the addition or subtraction of an I/O device, requires a different tuning. In practice, tuning information for every system configuration is compiled and maintained by the people who support the system, the system managers. Deriving, maintaining, and managing such configuration information is an excessive burden on the system managers.

It remains desirable to have a technique where a system adapts to the offered load, that is, the system tunes itself to the current configuration and retunes in response to any changes in the configuration.

SUMMARY OF THE INVENTION

The problems of deriving, maintaining and managing system configuration information and of tuning systems manually are solved by the present invention of an adaptive mechanism for efficient interrupt processing in a system supporting dynamic reconfiguration. The system supports dynamic reconfiguration by adding and removing I/O devices at run-time. The invention is also applicable where system load is a function of external devices not under the system's control. The adaptive mechanism determines whether the system was busy or idle in a given time unit and compares an interrupt delay value to a target value and adjusts the interrupt delay value and target value in response to the load on the system. When the system is heavily loaded, interrupts are delayed allowing more I/O events to be handled within a particular device's interrupt service routine. When the system is lightly loaded, interrupts are handled as soon as possible subject to the standard priority mechanisms of the system.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
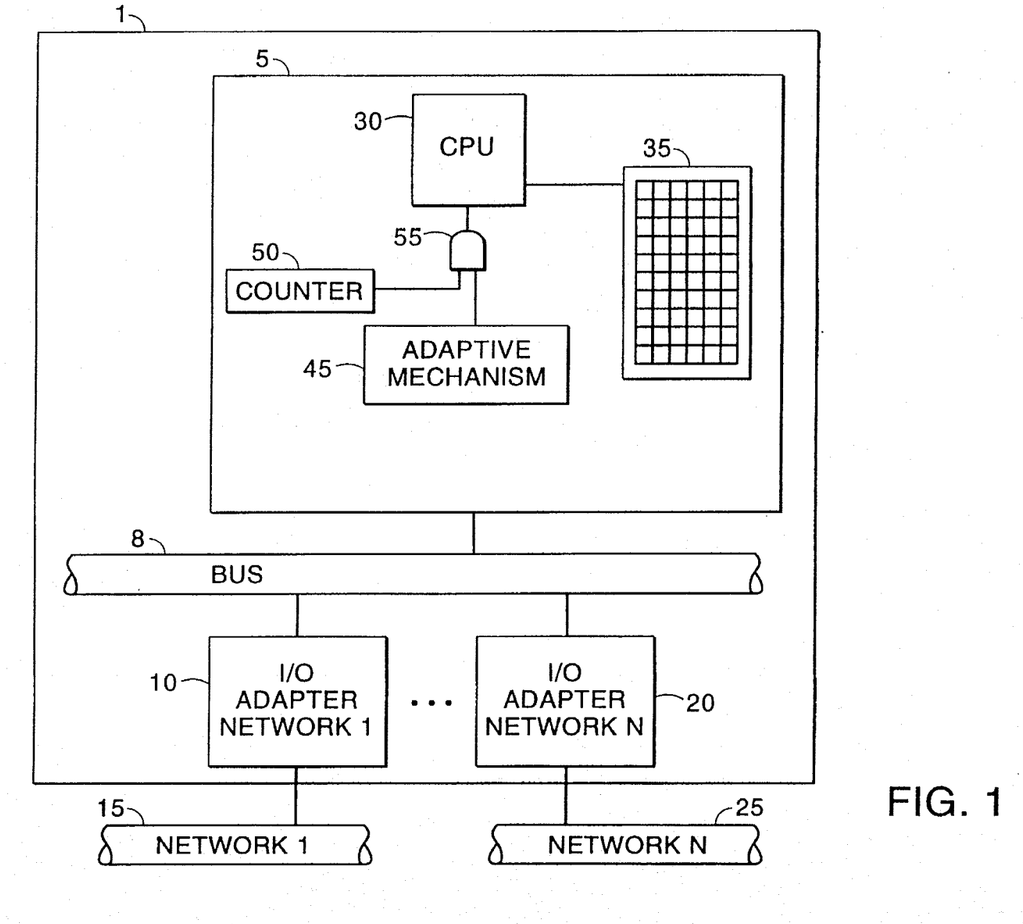
FIG. 1 is a system having an adaptive mechanism for handling interrupts.

The invention operates in a system such as that shown in FIG. 1. FIG. 1 shows a system 1, such as a computer or a packet-switching device, containing a processor subsystem 5 connected through a bus 8 to a plurality of I/O devices, indicated by a first I/O adapter 10 connected to a first network 15 and an nth I/O adapter 20 connected to an nth network 25. The processor subsystem 5 has a CPU 30, a memory 35, an adaptive mechanism 45, a counter 50 and an AND gate 55.

When data arrives over the networks 15, 25, the I/O adapters 10, 20 forward the data to the processor subsystem 5. On the processor subsystem 5, interrupts are used to gain the attention of the CPU 30 in order to process the data. Because the CPU 30 resources are limited, interrupts are delayed to allow the CPU 30 to perform the processing needed for lower priority interrupts already received and also to perform lower interrupt-priority system processes. The adaptive mechanism 45 dynamically determines a delay applied by counter 50 using system parameters stored in the memory 35 and measured system experience.

The adaptive mechanism 45 measures CPU 30 idle time during a predetermined time unit and makes a determination of whether the system is busy or idle. The adaptive mechanism 45 compares a current value for the interrupt delay with a target value. The adaptive mechanism 45 uses the system parameters to adjust the interrupt delay value according to the outcome of the comparison of the current value of the delay and the target value. Interrupts are serviced less frequently in a busy system, giving the CPU 30 time to process tasks before receiving more interrupts. Interrupts are serviced more frequently in an idle system so that the interrupts may be handled with minimum delay.

In operation, when the adaptive mechanism 45 has at least one interrupt and the counter 50 has counted the delay interval and signals that the delay time has passed, the AND gate 55 allows the interrupts to pass to the CPU 30.

Figure 2:
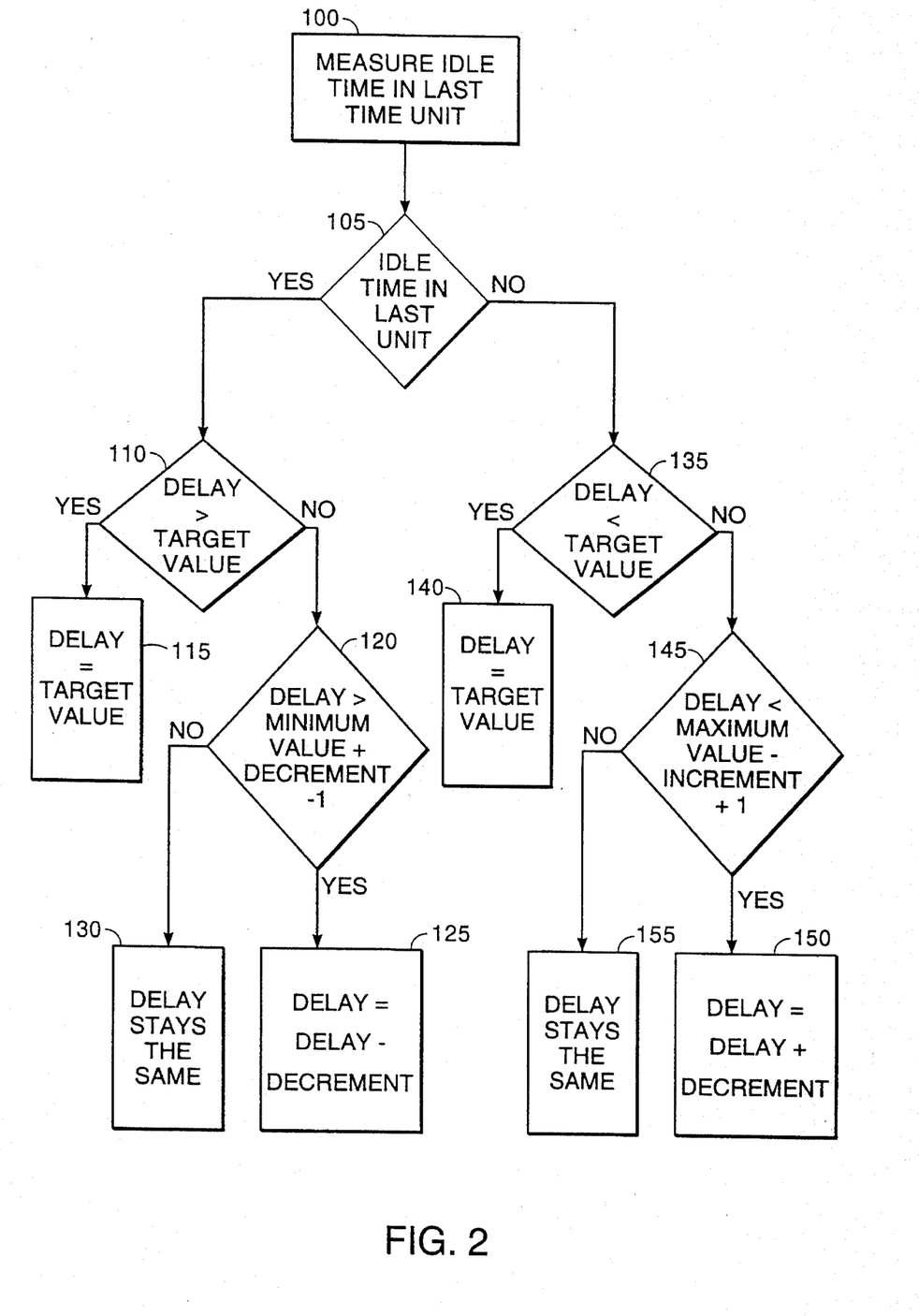
FIG. 2 is a flow chart of the adaptive handling of interrupts.

FIG. 2 shows a flow chart illustrating the process of adaptively handling interrupts according to the principles of the present invention. In a system where many I/O devices are connected, the I/O devices may generate so many interrupts that the central processing unit (CPU), without adequate interrupt handling, is overloaded. In the present invention, the system experience is used to dynamically adjust parameters for interrupt delay to handle interrupts efficiently and to thereby operate properly. For example, the interrupt delay allows the spanning tree process to meet the real-time requirements of the IEEE Std 802.1D-1990 spanning tree protocol.

The adaptive mechanism measures idle time in the CPU of the system during a predetermined time unit, block 100. The predetermined time unit is stored in memory as a parameter. An exemplary length of the predetermined time unit is 0.1 second. The requirement on the length for the predetermined time unit is that it be less than half the periodic real-time task deadline. For example, while verifying that the delay and target value are still appropriate for the current system load, occasionally too short a delay is used. Additional time units allow the too short a delay to be averaged with larger delays during a real-time deadline. This ensures that adequate CPU time is applied to the real-time tasks. A method of determining idle time in the system is to measure the time to process I/O events in the predetermined time unit, that is, to measure the time for the CPU scheduler to execute the software tasks involved in the I/O events including the interrupted time. A determination is made whether the system was idle or busy, that is whether or not there was idle time in the predetermined time unit, block 105. If the system was idle, an interrupt delay parameter is compared to a delay target value, block 110. The target value is a parameter used to generate new values for the interrupt delay parameter, and is also dynamically adaptive, as will be described below. If the interrupt delay parameter is greater than the delay target value, as in a formerly busy system which is newly idle, the interrupt delay parameter takes the value of the target value, block 115. In this way, the system adapts quickly to the newly idle state. If the interrupt delay parameter is not greater than the delay target value, block 110, as in a formerly idle system which is still idle, the delay parameter is compared to a minimum value, block 120, using the following expression:

$$\text{Delay} > \text{Minimum value} + \text{DECREMENT} - 1.$$

Minimum value and DECREMENT are predetermined values stored in a memory of the adaptive mechanism. If the above expression is true, the delay value is adjusted by subtracting the value of the parameter DECREMENT from it, block 125. This tunes the delay value so that interrupts are handled with low latency in the current idle state. If the above expression is false, there is no need to tune interrupt handling, and the interrupt delay value remains the same, block 130.

After a determination that the system was busy during the previous predetermined time unit, block 105, the interrupt delay parameter is compared to the delay target value, block 135. If the interrupt delay parameter is less than the delay target value, as would be the case in a formerly idle system which is newly busy, the interrupt delay parameter takes the value of the target value, block 140. In this way, the system adapts quickly to the newly busy state. If the interrupt delay parameter is not less than the delay target value, block 135, as in a formerly busy system which is still busy, the delay parameter is compared to a maximum value, block 145, using the following expression:

$$\text{Delay} < \text{Maximum value} - \text{INCREMENT} + 1.$$

Maximum value and INCREMENT are predetermined values stored in the memory of the adaptive mechanism. If the above expression is true, the delay value is adjusted by adding the value of the parameter INCREMENT to it, block 150. This tunes the delay value so that interrupts are handled more efficiently in the current busy state by amortizing interrupt processing overheads over more events. If the above expression is false, there is no need to tune the interrupt handling and the interrupt delay value remains the same, block 155.

Figure 3:
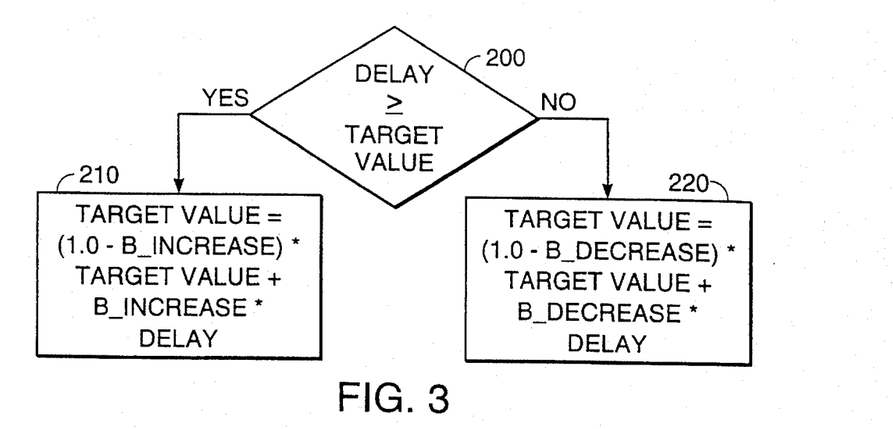
FIG. 3 is a flow chart of adjustment of the target value.

FIG. 3 is a flow chart showing how the target value is adjusted during operation of the system in order to adjust to reconfiguration of the I/O devices connected to the system. If the interrupt delay value is greater than or equal to the target value, block 200, the target value is adjusted, block 210, according to the following expression:

$$\text{Target value} = (1.0 - B\_\text{INCREASE}) * \text{Target value} + B\_\text{INCREASE} * \text{Delay}.$$

If the interrupt delay value is not greater than or equal to the target value, the target value is adjusted, block 220, according to the following expression:

$$\text{Target value} = (1.0 - B\_\text{DECREASE}) * \text{Target value} + B_{13} \text{DECREASE} * \text{Delay}.$$

With these expressions, the adapting process for the target value gives greater weight to recent system experience so that poor initial values are overcome and so that the system can adapt to run-time reconfiguration.

Figure 4:
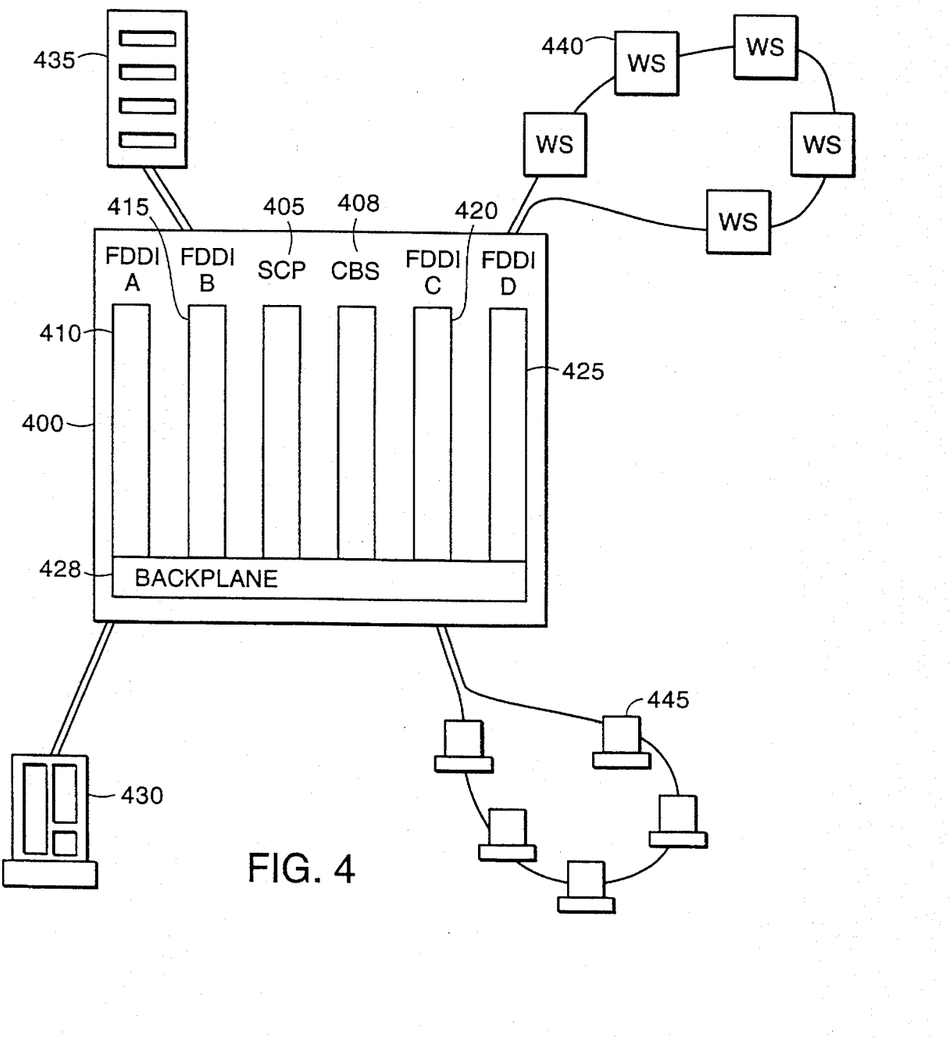
FIG. 4 is a diagram of packet-switching platform having a plurality of networks.

FIG. 4 is a packet-switching platform incorporating the present invention. The packet-switching platform 400 has six modules, a switch control processor (SCP) 405, a crossbar switch module 408 and four Fiber Distributed Data Interface (FDDI) line cards 410, 415, 420, 425 connected together through a backplane bus 428. The SCP 405 has an adaptive mechanism for interrupt handling according to the principles of the present invention. FDDI line card A 410 is connected to a server 430. FDDI line card B 415 is connected to a disk farm 435. FDDI line card C 420 is connected to a workstation network 440. FDDI line card D 425 is connected to a personal computer network 445. Packets from the server 430, the disk farm 435 and the networks 440, 445 are received at the line cards 410, 415, 420, 425. The line cards 410, 415, 420, 425 forward the packets to the cross-bar switch 408. The SCP 405 receives the packets from the cross-bar switch and as a result of packet receptions, the SCP 405 internally generates interrupts. After a device driver in a CPU on the SCP 405 receives the packets, other SCP software then transmits the packets to the appropriate destinations.

Figure 5:
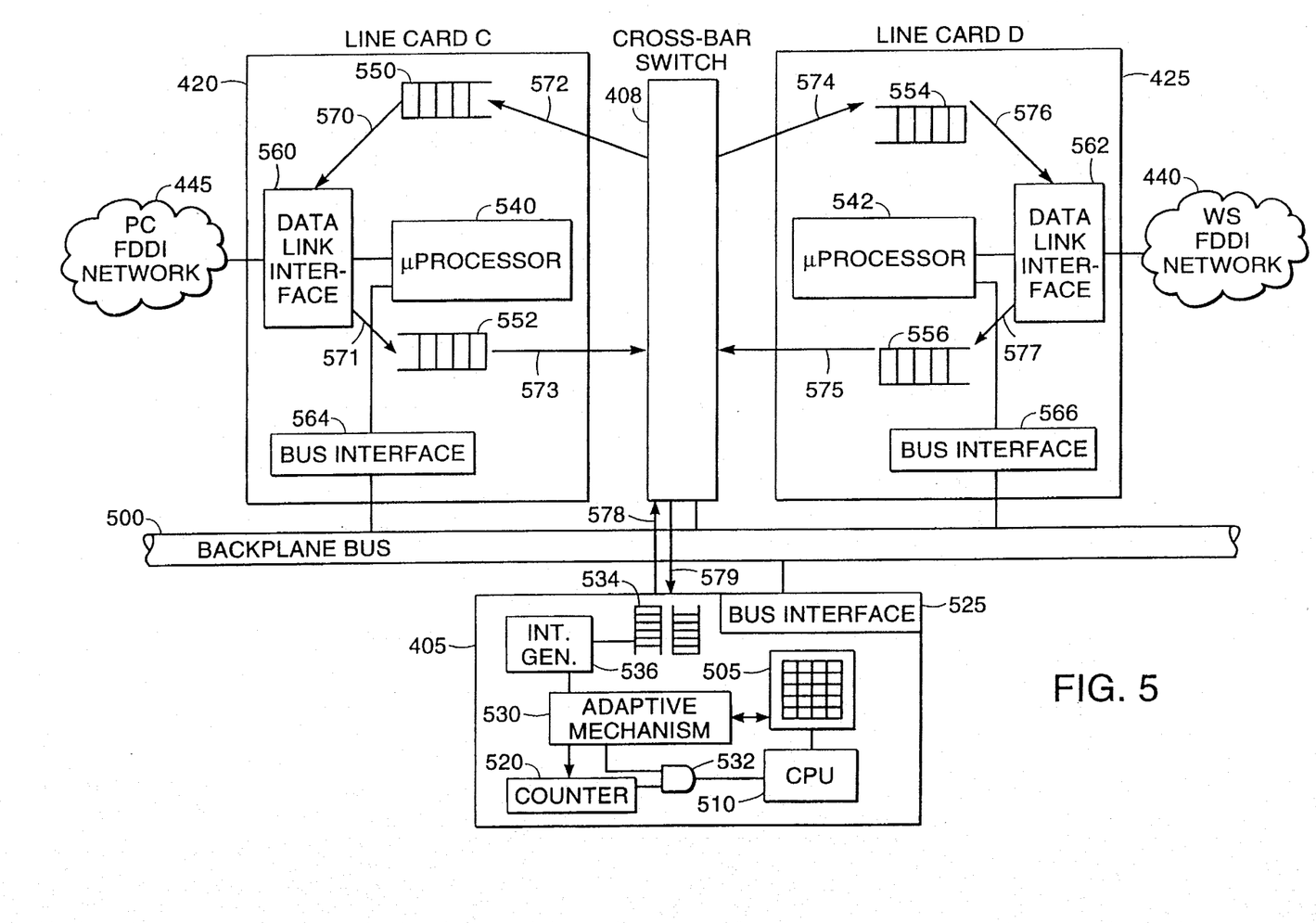
FIG. 5 is a further detailed diagram of the packet-switching platform of FIG. 4.

FIG. 5 shows the implementation of the present invention in the packet-switching platform of FIG. 4. FIG. 5 shows the SCP 405, FDDI line card C 420 connected to the personal computer network 445, FDDI line card D 425 connected to the workstation network 440, the cross-bar switch 408 and a backplane bus 500 which is a subset of backplane 428 of FIG. 4. The SCP 405 has a memory 505, a CPU 510, a counter 520, a bus interface 525, an adaptive mechanism 530, an AND gate 532, receive and transmit queues 534, and an interrupt generator 536. The adaptive mechanism 530 determines a delay value as described above in FIG. 2 and writes the value to the counter 520. The FDDI line cards C 420 and D 425 are controlled by microprocessors 540, 542. The line cards also contain first-in first-out queues (FIFOs) 550, 552, 554, 556 for packet reception and transmission, data link interfaces 560, 562 to the networks 445, 440, and bus interfaces 564, 566 to the bus. The arrows 570, 571, 572, 573, 574, 575, 576, 577, 578, and 579 indicate data paths. The non-arrowed lines indicate control paths.

The line cards 420, 425 receive data packets from the networks 445, 440. The packets travel to the cross-bar switch 408 along the paths 571, 573, 577, 575 and the cross-bar switch forward the packets along path 578 to the SCP 405. Packets received at the SCP 405 are buffered in a receive queue 534. When the queue 534 contains at least one packet, an interrupt is generated by the interrupt generator 536. The interrupt is observed by the adaptive mechanism 530 and is propagated to the AND gate 532. Subject to the output of the counter 520, the interrupt is propagated to the CPU 510.

Figure 6:
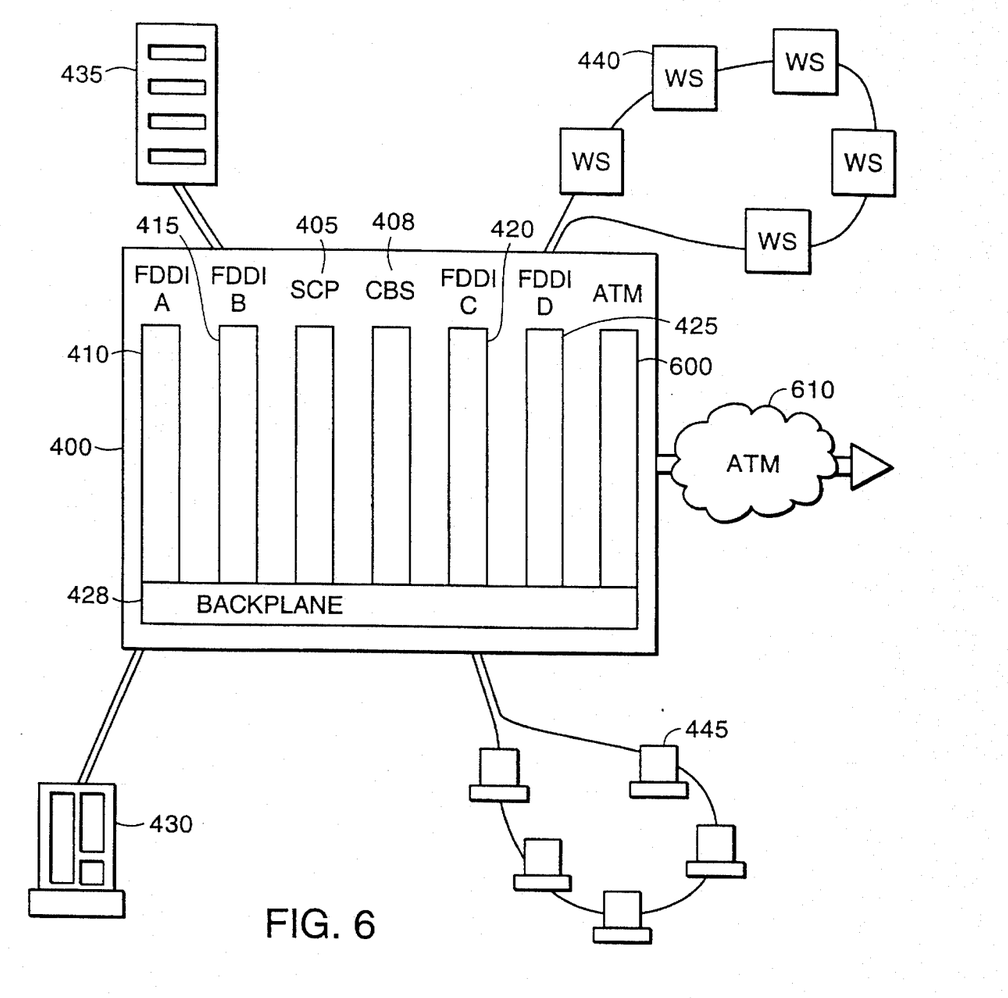
FIG. 6 is an alternative embodiment of a packet-switching platform.

FIG. 6 shows an alternative embodiment of a packet-switching platform incorporating the present invention. The packet-switching platform 400 has seven modules, a cross-bar switch module 408, a switch control processor (SCP) 405, four Fiber Distributed Data Interface (FDDI) line cards 410, 415, 420, 425 and an Asynchonronous Transfer Mode module (ATM) 600 all connected together through the backplane 428. The SCP 405 has an adaptive mechanism for interrupt handling according to the principles of the present invention. FDDI line card A 410 is connected to the server 430. FDDI line card B 415 is connected to the disk farm 435. FDDI line card C 420 is connected to the workstation network 440. FDDI line card D 425 is connected to the personal computer network 445. The ATM line card 600 is connected to an ATM network 610. Packets from the server 430, the disk farm 435 and the networks 440, 445 are received at the FDDI line cards 410, 415, 420, 425. Cells from the ATM network 610 are received at the ATM line card 600. The line cards 410, 415, 420, 425, 600 forward the data through the cross-bar switch 408 to the SCP 405 using interrupts. The SCP 405 transmits the data to the appropriate destinations.

Operation

Figure 7:
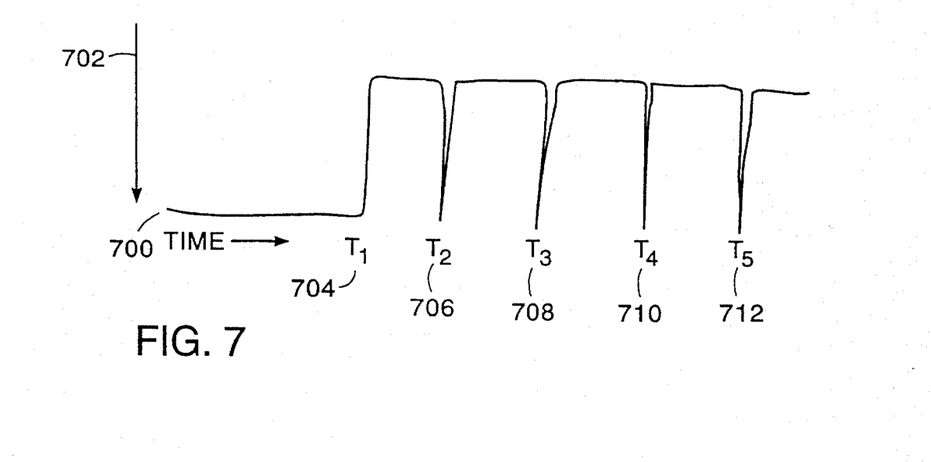
FIG. 7 is a timing diagram showing undesirable system operation.

FIG. 7 is a timing diagram showing undesirable operation of a system receiving interrupts. The horizontal axis 700 is time and the vertical axis 702 is CPU interrupt priority level. An interrupt arrives at $T_1$ 704 and the CPU returns from interrupt at $T_2$ 706 as another interrupt arrives. This operation continues through $T_3$ 708, $T_4$ 710, and $T_5$ 712. In a system where data is forwarded by a process which is not the device driver, data is not forwarded during this type of operation because the system has no time to decide and to act. Also, there are other processes in the system, other than the device driver, which are important and which do not get serviced by the CPU.

Figure 8:
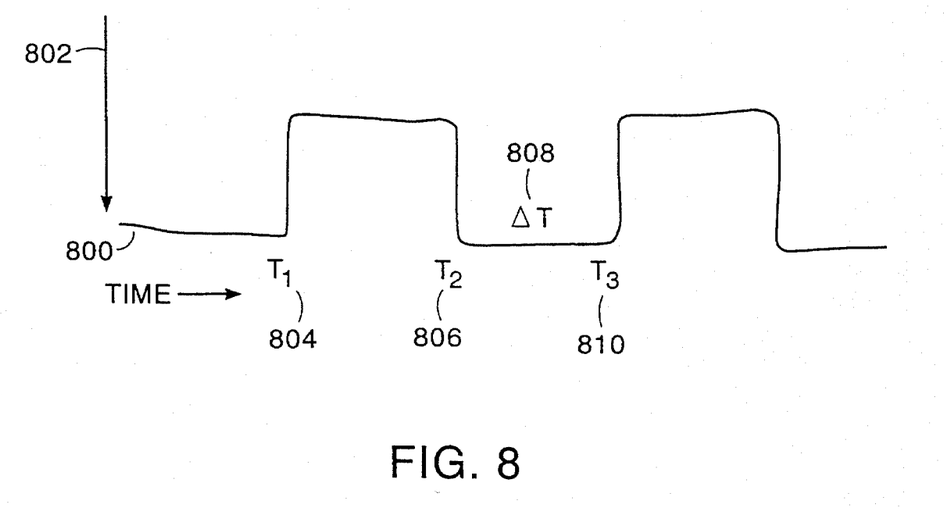
FIG. 8 shows desirable system operation.

FIG. 8 shows desirable operation of the system. The horizontal axis 800 is time and the vertical axis 802 is the CPU interrupt priority level. Before $T_1$ 804, the system is idle, at $T_1$ 804 a data packet arrives, between $T_1$ 804 and $T_2$ 806 the soft-ware driver executes and by $T_2$ 806 the software driver has exited. The interrupt delay $\Delta T$ 808 determines the length of time between $T_2$ 806 and $T_3$ 810. The CPU uses this time to decide where to forward the data packet. Intervals like $\Delta T$ 808 provide low interrupt priority processes the requisite time to perform their work, for example, forwarding data packets. Other examples of processes outside the driver that need time to execute include processes that execute bridging and routing network protocols which have real-time requirements. If these processes do not receive the requisite CPU service, then the network can become unusable for all connected devices. Intervals like $\Delta T$ 808 ensure that these processes receive the requisite CPU service.

Alternative Embodiments

The adaptive mechanism may be used on all types of interrupts, for example on terminal lines for a terminal server and for disk interrupts on a file server.

The counter and the AND gate could be located at each interrupting device rather than at the destination CPU. This embodiment of the current invention allows well-behaved devices to receive low-latency service even when there is another device on the system which requests a lot of service.

In a system with multiple processors, each processor could have the adaptive mechanism as described above. Each processor could have an adaptive mechanism, a counter and an AND gate.

If the load is so low that the driver exits before driver-applied processing limits are reached, latency may be further reduced by applying a counter value of zero rather than the current interrupt delay value while the new values for interrupt delay and target delay are being determined. This provides low-latency interrupt service when a busy system becomes extremely idle. To guarantee correct system operation, the decision to use zero would have to include some knowledge of previous software driver entry times and service times.

The boxes 125 and 150 of FIG. 2 are illustrative of decreasing, and increasing functions which could be used. Other functions which could be used include linear functions using both multiplication and addition.

Another method for masking interrupts is to use a software timer and interrupt mask registers to limit the frequency of the interrupts.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. An apparatus for adaptively processing interrupts, comprising:
   a memory for storing a delay value for interrupt processing and for storing a target value;
   means for determining system idle time;
   means for comparing said delay value and said target value; and,
   means for altering said delay value in response to said comparing and in response to said means for determining system idle time.

2. A method for adaptively processing interrupts, comprising the steps of:
   determining system idle time;
   comparing a delay value for interrupt delay to a target value; and,
   altering said delay value in response to said comparing and said determining.

3. The apparatus of claim 1 where said means for determining system idle time comprises:
   means for measuring idle time during a predetermined time unit.

4. The apparatus of claim 1 further comprising:
   a counter responsive to a received interrupt, said counter counting a delay interval equal to said delay value.

5. The apparatus of claim 1 further comprising:
   means for signaling that a delay interval equal to said delay value is passed.

6. The apparatus of claim 1 further comprising:
   means for adjusting said target value in response to said delay value.

7. The method of claim 2 wherein said determining system idle time comprises determining system idle time in a predetermined time unit.

8. The method of claim 2 further comprising:
   adjusting said target value in response to said delay value.

9. An apparatus for adaptively processing interrupts, comprising:
   a memory for storing a delay value for interrupt processing and for storing a target value;
   means for determining system idle time;
   means for comparing said delay value and said target value; and,
   means for altering said delay value in response to said comparing and in response to said means for determining system idle time without altering a priority level of said interrupts.

10. A method for adaptively processing interrupts, comprising the steps of:
    determining system idle time;
    comparing a delay value for interrupt delay to a target value; and,
    altering said delay value in response to said comparing and said determining without altering a priority level of said interrupts.

* * * * *